(12) United States Patent
Hoshi

(10) Patent No.: US 6,690,684 B1
(45) Date of Patent: Feb. 10, 2004

(54) OPTICAL ELEMENT AND OPTICAL APPARATUS PROVIDED WITH THE SAME

(75) Inventor: Hiroaki Hoshi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/408,442

(22) Filed: Sep. 29, 1999

(30) Foreign Application Priority Data

Oct. 1, 1998 (JP) .......................................... 10-294670

(51) Int. Cl.[7] ................................................. H01S 3/30
(52) U.S. Cl. ............................. 372/5; 372/92; 372/100; 372/98
(58) Field of Search ............................ 372/5, 10, 23, 372/92, 108, 98, 99, 100, 107, 55, 69, 97; 359/359, 630, 726, 728, 619–628; 356/328

(56) References Cited

U.S. PATENT DOCUMENTS

| 5,420,845 | A | * | 5/1995 | Maeda et al. ............. 346/135.1 |
| 5,450,376 | A | | 9/1995 | Matsumura et al. |
| 5,543,966 | A | | 8/1996 | Meyers |
| 5,581,405 | A | | 12/1996 | Meyers et al. |
| 5,589,983 | A | | 12/1996 | Meyers et al. |
| 5,610,897 | A | | 3/1997 | Yamamoto et al. |
| 5,638,212 | A | | 6/1997 | Meyers et al. |
| 5,694,247 | A | | 12/1997 | Ophey et al. |
| 5,726,805 | A | | 3/1998 | Kaushik et al. |
| 5,831,382 | A | * | 11/1998 | Bilan et al. ............. 313/346 R |
| 5,939,829 | A | * | 8/1999 | Schoenbach et al. ....... 313/491 |

FOREIGN PATENT DOCUMENTS

JP 58-174906 10/1983

* cited by examiner

Primary Examiner—Paul Ip
Assistant Examiner—Delma R. Flores Ruiz
(74) Attorney, Agent, or Firm—Fitzpatrick, Cella, Harper & Scinto

(57) ABSTRACT

An optical element includes a base member formed of a material transmitting a light of a predetermined wavelength therethrough and an optical acting surface provided on the base member. The optical acting surface has a plurality of micro structures smaller than the predetermined wavelength for creating potential confining one of an electron and a dipole moment therein, and desired optical action utilizing the light of the predetermined wavelength discharged by the vibration of the electron or the dipole moment confined in the potential formed by the micro structures.

2 Claims, 5 Drawing Sheets

OPTICAL ELEMENT AND OPTICAL APPARATUS PROVIDED WITH THE SAME

BACKGROUND OF THE INVENTION

1. Field of the Invention

This invention relates to an optical element and an optical apparatus using the same, and is particularly suitable for the various optical systems of a photographing apparatus such as a video camera or a still camera.

2. Related Background Art

Various reflecting surfaces such as a mirror and a curved surface reflecting mirror have heretofore often been used in an optical system used in an image pickup apparatus such as a video camera or a still camera. Generally, a reflecting surface often comprises an optical polished surface sufficiently reduced in surface roughness and single-layer film of a metal or a dielectric material or multi-layer film comprising a combination thereof and evaporated on the optical polished surface.

If the refractive index and thickness of the film can be strictly controlled, there will be obtained an expected interference effect and a desired reflectance. Generally, a higher reflectance and a more desired spectral reflectance characteristic (spectrum) are obtained by the multi-layer film than by the single-layer film.

However, the multi-layer film is formed by alternately superposing substances relatively differing in refractive index upon one another with a uniform thickness and therefore, precise feeding of the control of various conditions for the evaporation is necessary. Therefore, the evaporating apparatus becomes large-scaled. Further, depending on the substances evaporated and the thickness and the number of layers, control and knowhow of the apparatus are necessary. Also, it is often the case that it is necessary to set conditions precisely, requiring much time, and this results in the high cost of a reflecting optical element.

On the other hand, there have heretofore been proposed various mirror optical systems using a reflecting mirror such as a concave mirror or a convex mirror instead of the lens of a photo-taking lens having a great full lens length to thereby bend the optical path efficiently and achieve the compactness of the optical system.

In the above-described prior-art reflecting optical element, there are many and complicated manufacturing processes for the formation of reflecting film for obtaining a desired reflectance, and this has resulted in a high cost which has posed a great problem during mass production.

Also, a mirror optical system using a plurality of reflecting mirrors has suffered from the problem that if the reflectance in each reflecting surface is low, the transmittance of the entire optical system becomes low and the effect of using the reflecting mirrors becomes reduced.

SUMMARY OF THE INVENTION

The present invention has as its object to solve the above-noted problems peculiar to the prior art and to provide an optical element of a novel construction which realizes desired optical action.

To solve the above object, the optical element of a first invention of the application is characterized by the provision of:

a base member formed of a material transmitting a light of a predetermined wavelength therethrough; and an optical acting surface provided on the base member, the optical acting surface having a plurality of micro structures smaller than the predetermined wavelength for creating potential confining one of an electron and a dipole moment therein, and desired optical action utilizing the light of the predetermined wavelength discharged by the vibration of the electron or the dipole moment confined in the potential formed by the micro structures.

Also, the optical element of a second invention of the application is characterized by the provision of:

a base member formed of a material transmitting a light of a predetermined wavelength therethrough, the base member including:

two refracting surfaces; and at least one reflecting surface having a plurality of micro structures smaller than the predetermined wavelength for creating potential confining one of an electron and a dipole moment therein, and reflecting the light of the predetermined wavelength by the utilization of the light of the predetermined wavelength discharged by the vibration of the electron or the dipole moment confined in the potential formed by the micro structures;

wherein the light of the predetermined wavelength incident from one of the two refracting surfaces is internally reflected by at least one reflecting surface, and thereafter is directed to the other refracting surface.

Further, the optical apparatus of a third invention of the application is characterized by the provision of the optical element of the first invention or the second invention of the application.

DESCRIPTION OF THE PREFERRED EMBODIMENTS

Figure 1:
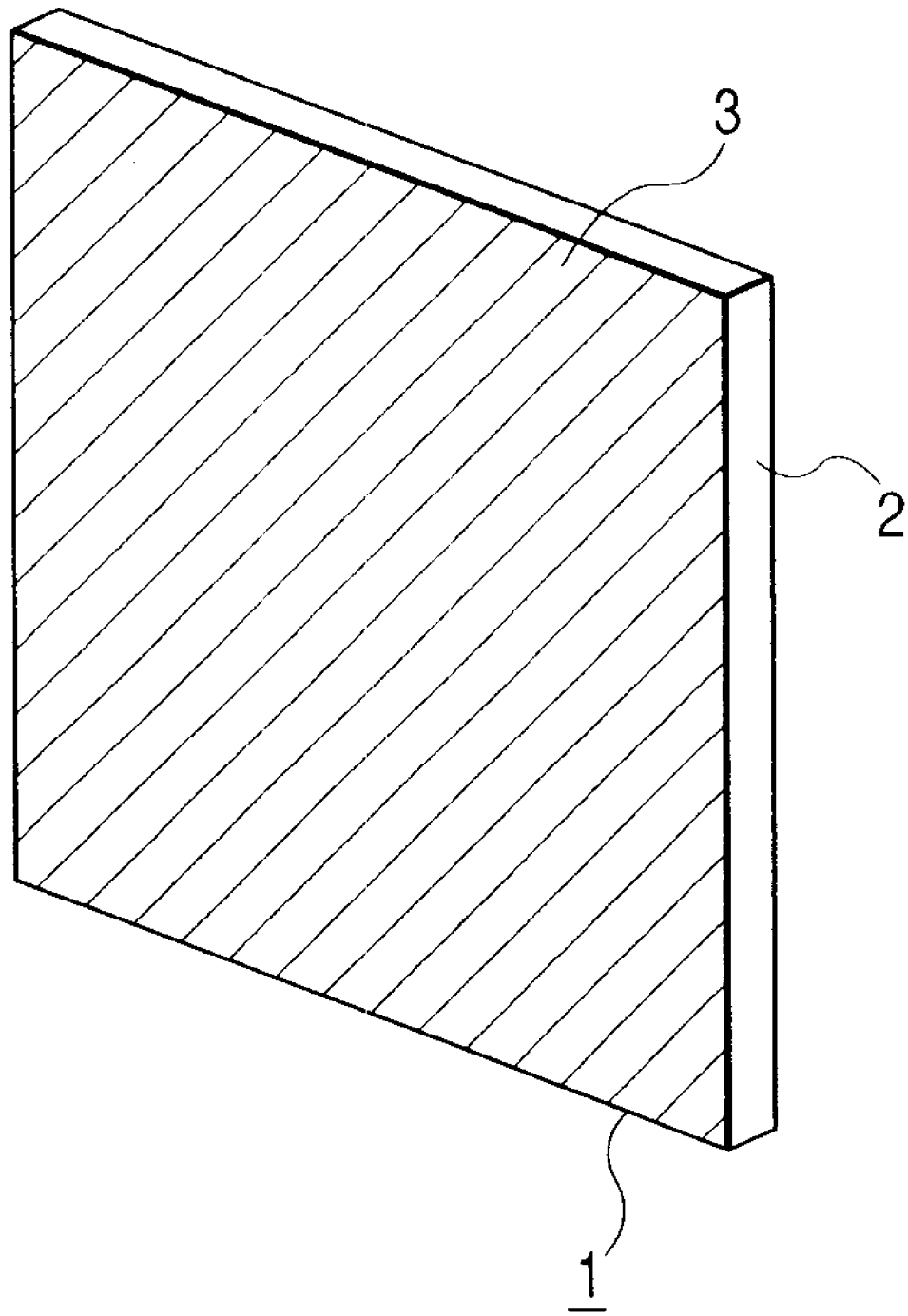
FIG. 1 is a perspective view showing the construction of an embodiment of a reflecting optical element.

FIG. 1 is a perspective view of the essential portions of Embodiment 1 of the present invention, and more particularly is a perspective view when reflection type micro grating structure is carried out on a plane mirror (optical element). In FIG. 1, the reference numeral 1 designates a plane mirror, and on the surface of a plane glass substrate 2 transparent to visible light, there is reflecting structure (reflecting micro grating structure) 3.

Figure 2A:
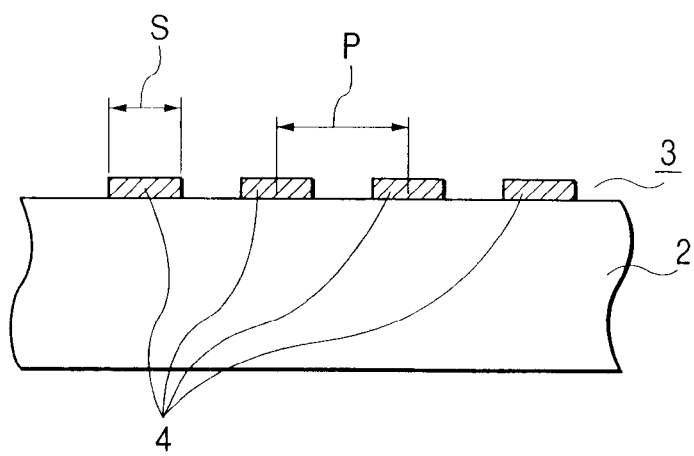
FIGS. 2A, 2B, 2C and 2D are enlarged cross-sectional views of respective embodiments of the reflecting structure.

FIG. 2A is an enlarged cross-sectional view of the reflecting structure 3. In FIG. 2A, micro metallic layer islands 4 are one-dimensionally or two-dimensionally arranged at a pitch P on the surface of the plane glass substrate 2. The uniformization of reflectance is achieved thereby. Also, the size S of the metallic layer islands 4 in the plane thereof is sufficiently smaller than the wavelength used. The interval P between the adjacent metallic layer islands 4 is also sufficiently smaller than the wavelength.

If use is made, for example, of a laser beam of a wavelength 0.63 µm emitted from an He—Ne laser, the size S and pitch P of the metallic layer islands 4 may be small by a predetermined ratio of the wavelength, e.g., 1/100 to 1/10, and may desirable be 0.005 µm to 0.1 µm.

This numerical value provides structure in which the metallic layer islands 4 are two-dimensionally uniformly arranged at the pitch P on the surface of the plane glass substrate 2. Plural kinds of metallic layer islands 4 differing in size and pitch may be provided on the substrate.

Such structure can be patterning-processed by thinly coating the surface of the plane glass substrate 2 with a metal by silver mirror reaction or electrolytic/electroless plating, and by the process of photolithography or an electron beam or dry etching, particularly reactive ion beam etching.

However, it can be achieved more easily if the process of regularly arranging metallic layer islands having a diameter of the order of 0.02 µm is utilized at the early stage of the metal coat such as ordinary plating. As the metal, aluminum is optimum, but it is also possible to use silver, copper, chrominium or the like.

Figure 3A:
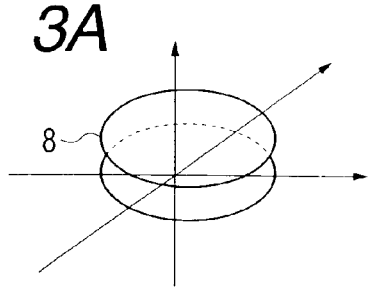
FIGS. 3A, 3B, 3C, 3D, 3E, 3F, 3G and 3H are structural typical views and potential typical views of the respective embodiments of the reflecting structure.
Figure 3B:
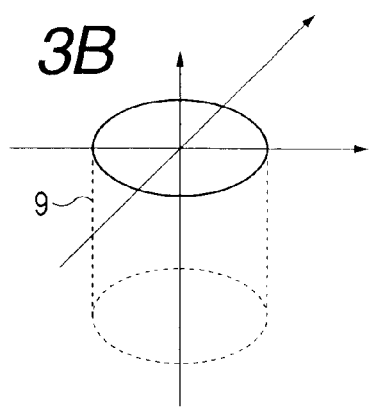

FIG. 3A is a typical view of the three-dimensional structure of a metallic layer island 4. FIG. 3B is a typical view of potential made by that structure.

Light incident on the reflecting structure 3 from the left direction in the plane of the drawing sheet of FIG. 1 microscopically interacts with the reflecting structure 3 having structure smaller than the wavelength shown in FIG. 2A. Usually, light incident on a metal vibrates electrons in the metal and part of the light is absorbed and part of the light becomes scattered light by electric dipole radiation, but in the present embodiment, the size S of the metallic layer islands 4 is very small and therefore, the electrons behave not as free electrons, but as restrained electrons.

That is, as shown in FIG. 3A, the electrons are confined and vibrated in narrow potential and therefore, they behave as if they were the dipole moment of a dielectric material, and emit electromagnetic waves. The metallic layer islands 4 are arranged at a pitch P smaller than the wavelength of the light used and therefore, the vibration in the potential between the adjacent metallic layer islands 4 has coherence, and the emitted electromagnetic waves also have coherence. When the electromagnetic waves from the respective metallic layer islands 4 and the electromagnetic waves from portions free of the metallic layer islands 4 are synthetically superposed one upon another, the phases are negated with each other on the transmission side and the phases are strengthened with each other on the reflection side. Thus, there is no transmitted light and only reflected light is present.

As shown in FIG. 3B, individual potential has axis-symmetry in the plane and as shown in FIG. 2A, is distributed two-dimensionally with periodicity in the plane and therefore, there can be realized a reflectance characteristic almost free of anisotropy even for the polarization of incident light.

Of course, to improve the uniformity of the periodicity in the plane, it is possible to adopt the arrangement of several closest series. But, when a self-organizing process is used, the arrangement is an inherent arrangement. Therefore, the realization thereof is difficult, and free arrangement becomes possible by photolithographic patterning.

Since the structure of FIG. 3A having the potential of FIG. 3B is periodically two-dimensionally distributed as shown in FIG. 2A, a reflecting optical element for reflecting incident light by the action of the reflecting structure 3 of FIG. 1 is realized.

Figure 3C:
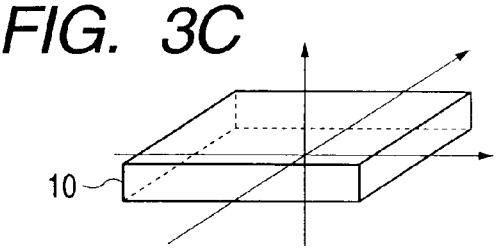
Figure 3D:
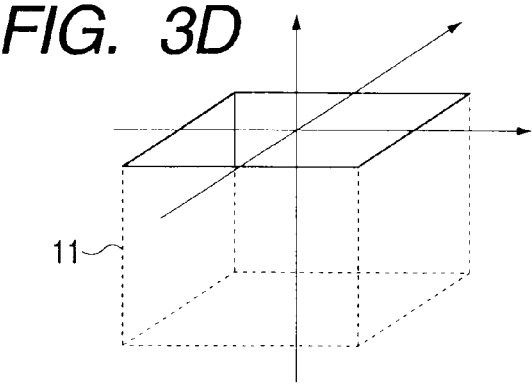

While the metallic layer island 3 in the present embodiment has been described with respect to the cylindrical type shown in FIG. 3A, the present invention can be carried out even for a prismatic type as shown in FIG. 3C. When patterning is done by photolithography or the like, such a prismatic shape is easier to make. The potential in this case has two intrinsic axes orthogonal to each other in the plane as shown in FIG. 3D, but these axes are arranged with periodicity in their directions and therefore, the anisotropy of polarization is difficult to put out.

Thus, according to the present invention, the reflecting layer of multi-layer film structure which has heretofore been necessary is made unnecessary and the reflecting optical element by simple reflecting structure can be provided inexpensively.

Figure 2B:
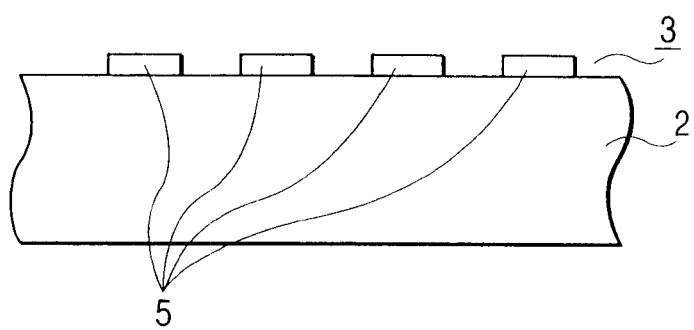

FIG. 2B is a cross-sectional view of the essential portions of Embodiment 2 of the present invention. This embodiment is a modification of Embodiment 1 in which the reflecting structure 3 is provided by dielectric material layer islands 5. The portions of Embodiment 2 which are designated by the same reference numerals as those in Embodiment 1 need not be described.

In FIG. 2B, the dielectric material layer islands 5 are two-dimensionally arranged with a size S and at a pitch P, as in Embodiment 1. The dielectric material layer islands 5 have the shape of FIG. 3A or FIG. 3C, and the potential thereof is such as shown in FIG. 3B, or FIG. 3D, and substantially the same action as that of Embodiment 1 is obtained.

As the dielectric material, use can be made of a material used for ordinary multi-layer film, such as $SiO_2$, SiO or MgCl. The method of making the dielectric material layer islands also is substantially the same process as that in Embodiment 1.

In contrast with Embodiment 1, in the present embodiment, a dielectric material is adopted for the reflecting structure 3, thereby as compared with the case where a metal of much absorption is used, the absorption as the reflecting film is reduced and the reflecting efficiency is improved. However, as compared with the metal, the setting of the condition for a self-organizing arrangement is difficult and patterning becomes necessary, and the use of the dielectric material is a choice when priority is given to performance rather than cost.

Figure 2C:
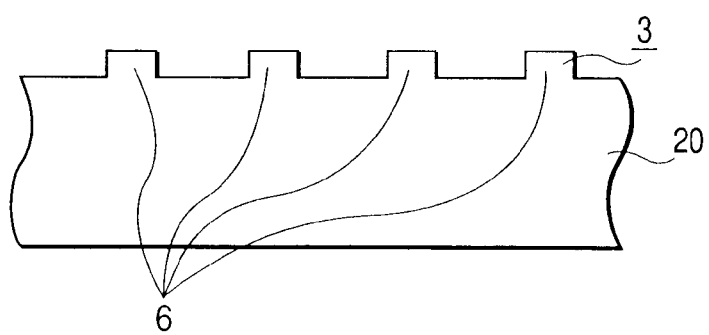

FIG. 2C is a cross-sectional view of the essential portions of Embodiment 3 of the present invention. In contrast with the aforedescribed embodiments, in this embodiment, the reflecting structure 3 is made by integral molding with a plane plastic substrate 20. The portions of the present embodiment designated by the same reference numerals as those in the aforedescribed embodiment need not be described.

In FIG. 2C, the reflecting structure 3 is of the same material as the plane plastic 20, i.e., a dielectric material. The size S and the pitch P may be substantially the same as those in the aforedescribed embodiments. Dielectric material layer islands 6 have the shape of FIG. 3A or FIG. 3C, and the potential thereof is also such as shown in FIG. 3B or FIG. 3D, and substantially the same action as that in the aforedescribed embodiments is obtained.

As plastic, use can be made of a material such as polycarbonate or acryl used in ordinary injection molding. As regards the method of making the dielectric material layer islands 6, the plastic substrate 20 and the reflecting structure 3 can be integrally made by injection molding or compression molding using a metal mold. If a mold of the shape of the dielectric material layer islands 6 is formed on the surface of the metal mold, it can be transferred to a plastic molded article at the order of 0.1 nm.

To integrally mold the convex reflecting structure 3 as shown in FIG. 2C, reversed concave structure can be made on the surface of a metal mold. As the surface working of the metal mold, cutting and polishing are usually done, but to form the micro structure of the present embodiment, the process of photolithography or the patterning work by an electron beam or dry etching, particularly reactive ion beam etching is suitable.

In the present embodiment, the purpose can be achieved by molding and therefore, as compared with the aforedescribed embodiments in which evaporation is effected on each one of the optical elements, the efficiency of production is much higher and an inexpensive reflecting optical element can be realized. However, as compared with the aforedescribed embodiments, the present embodiment is the reflecting structure 3 using the same dielectric material as the substrate 20 and therefore, the securement of the shape, particularly the depth, of the potential becomes difficult.

Accordingly, it is necessary to make the height of the dielectric material layer islands 6 (the depth of the concave structure of the metal mold) great to thereby improve the confining effect, but it is in a direction converse to the mold release property during molding and therefore, care needs to be taken.

Figure 2D:
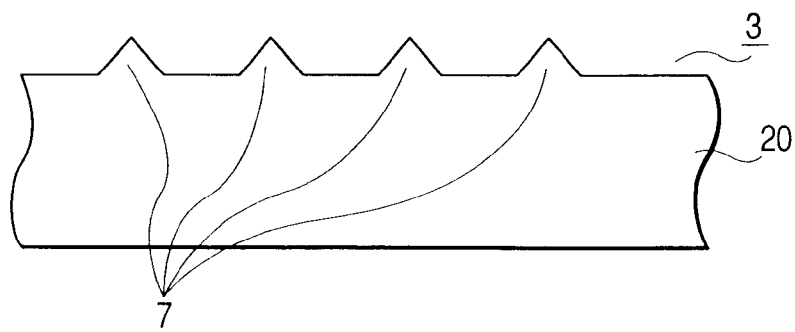
Figure 3E:
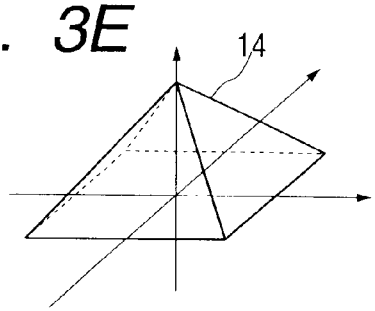
Figure 3F:
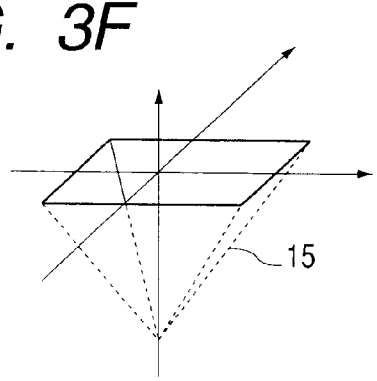
Figure 3G:
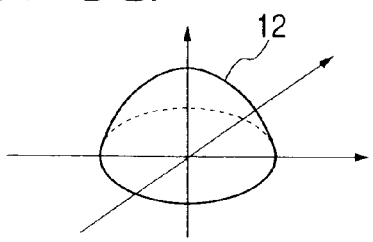

Embodiment 4 of the present invention will now be described. FIGS. 2D, 3E and 3G are illustrations of the essential portions of the optical element according to Embodiment 4 of the present invention. In contrast with Embodiment 3, the present embodiment is a modified embodiment in which the shape of the reflecting structure 3 is improved into an easily moldable shape. The portions of the present embodiment designated by the same reference numerals as those in Embodiment 3 need not be described.

In FIG. 2D, the cross-sectional shape of the reflecting structure 3 is triangular, but the specific shape as a dielectric material layer island 7 is a quadrangular pyramid as shown in FIG. 3E. The potential is such as shown in FIG. 3F and is a shape which is low in the confining effect, but as compared with Embodiment 3, the structure of the present embodiment is good in mold release property and therefore, the height of the dielectric material layer 7 can be made high and thus, the potential can be secured deeply and covered.

Figure 3H:
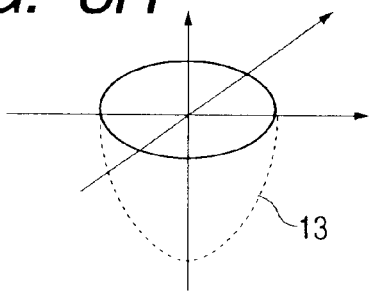

FIG. 3G shows an example of the reflecting structure 3 which is further improved in respect of the balance between mold release property and potential. By providing a hanging bell shape, the potential becomes such as shown in FIG. 3H and the confining effect is improved. However, the mold release property is inferior to FIG. 3E.

Figure 4:
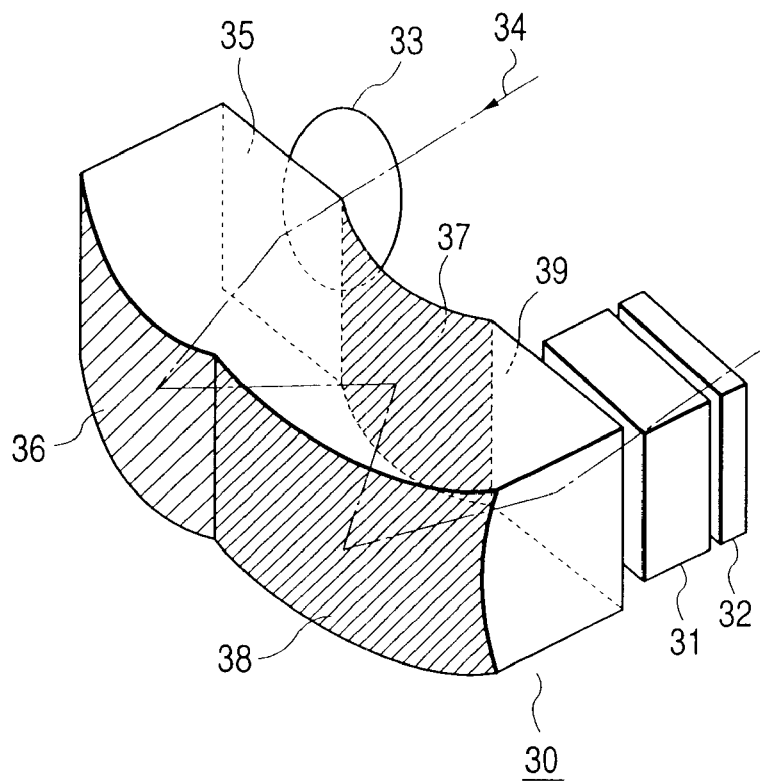
FIG. 4 is a perspective view showing the construction of Embodiment 1 of an image pickup apparatus.

FIG. 4 is a schematic view of the essential portions of Embodiment 1 of an image pickup apparatus having an optical member using the reflecting optical element of the present invention. FIG. 4 shows a case where an imaging system is applied to a portion of a digital camera.

In FIG. 4, the reference numeral 30 designates a reflecting optical element as an image pickup optical system, the reference numeral 31 denotes an optical LPF (low-pass filter) and infrared cut filter, the reference numeral 32 designates a two-dimensional CCD as an image pickup element, the reference numeral 33 denotes a stop, the reference numeral 34 designates a reference axis ray, the reference numeral 35 denotes an entrance refracting surface, the reference numeral 39 designates an exit refracting surface, and the reference numerals 36, 37 and 38 denote asymmetrical aspherical reflecting surfaces.

The ray of light 34 from an object is transmitted through a stop 33, enters the optical element 30 from the entrance refracting surface 35, is reflected by the reflecting surfaces 36, 37 and 38 which are off-axial surfaces (curved surfaces of which the surface normal does not coincide with a reference axis (defined by a ray of light passing through the center of the stop and incident on the center of the image pickup surface 32 perpendicularly thereto)), leaves the optical element 30 from the exit refracting surface 39, has its spatial frequency response and spectrum corrected by the optical LPF and infrared cut filter 31, and forms an object image on the two-dimensional CCD 32. The optical element 30 is an off-axial optical system provided with an off-axial surface.

An imaging optical system is constituted by the optical element 30 alone and therefore, a thin, compact and light digital camera is realized. The reflecting surfaces 36, 37 and 38 are rotation-asymmetrical aspherical surfaces and by using such asymmetrical aspherical surfaces, eccentric aberration caused by the off-axial optical system is corrected. These reflecting surfaces 36, 37 and 38 which are asymmetrical aspherical surfaces are constructed of the micro structure giving the reflecting action described in connection with FIGS. 2A to 2D.

Figure 5A:
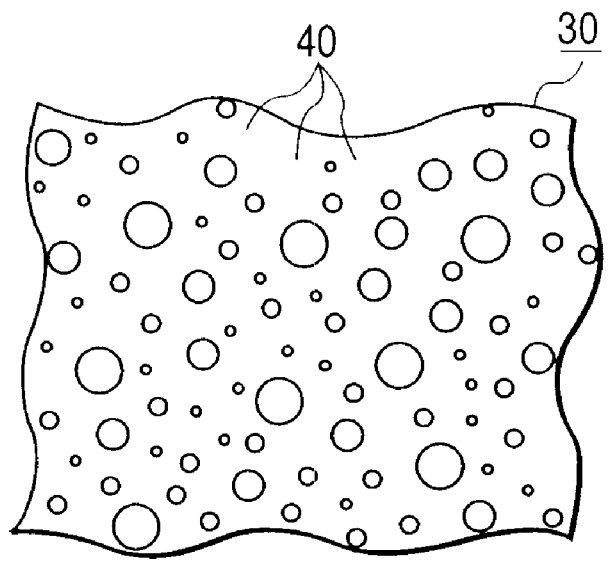
FIGS. 5A and 5B are a construction typical view and a distribution graph, respectively, of the reflecting structure of a reflecting optical element used in Embodiment 1 of the image pickup apparatus.

FIG. 5A is an enlarged typical view of the reflecting surfaces 36, 37 and 38. In FIG. 5A, the optical element 30 is such that dielectric material layer islands 40 as a reflecting structure are formed of the same material as a base member on the base member formed of a plastic material transmitting visible light therethrough. In the reflecting structure of the present embodiment, in order to cover the wavelength of the visible range, the size S and pitch P of the dielectric material layer islands 40 are not the same unlike the aforedescribed embodiments, but are modulated in a predetermined distribution.

Figure 5B:
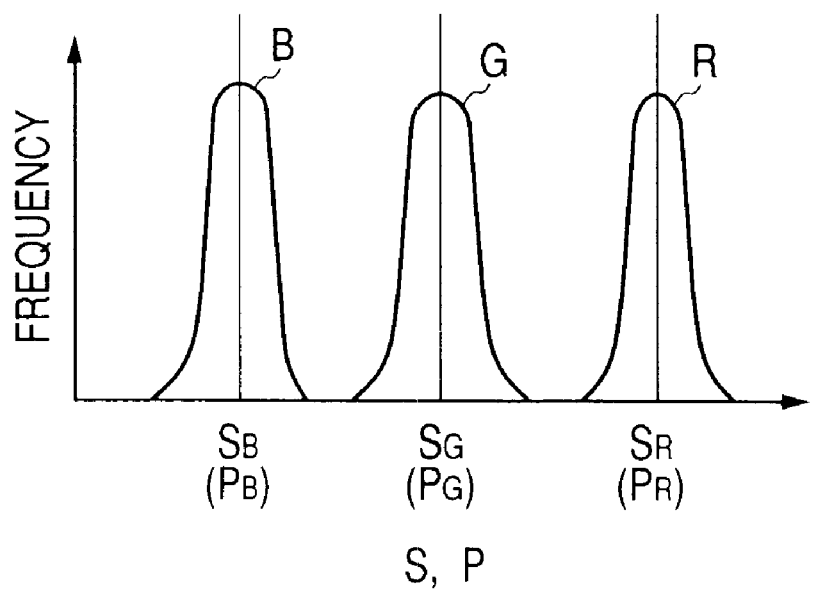

FIG. 5B is an example of a distribution graph illustrating the degree distribution of the size S or the pitch P of the dielectric material layer islands 40. The axis of abscissas represents the size S or the pitch P, and the axis of ordinates represents the degree thereof.

Three spectral peaks R, G and B correspond to the color resolutions of a digital camera, specifically, red, green and blue representative of the color filters of a CCD. The distribution of the size S of the dielectric material layer islands 40 corresponding to the respective color lights is distributed about $S_R$, $S_G$ and $S_B$, and is separated into levels free of cross talk.

It is possible to optimize the distributions $S_R$, $S_G$ and $S_B$ from the order of 1/100 to 1/10 of each wavelength into wavelengths.

Accordingly, there is no problem even if the size S corresponding to each color light is not continuous, but the interior of each peak of the spectrum is discrete to a certain degree. This also holds true of the pitch P, and it is desirable that the pitch P be a spectral distribution having the axis of abscissas about $P_R$, $P_G$ and $P_B$ optimized for respective color lights. While the spectral distributions separated about the ordinary spatial frequency become different distributions, the size S and the pitch P are divisionally described herein in order to make the idea of the present invention clear.

The method of making the optical element 30 is injection molding using a metal mold. This method can be realized even if the material is glass or plastic, but in the present embodiment, plastic was adopted in view of the light weight.

Accordingly, as in Embodiment 3, the mold of the reflecting structure shown in FIGS. 5A and 5B is made in the surface of a metal mold, and a reflecting surface can be formed on the optical acting surface of the optical element 30 by integral molding.

As described above, according to the present embodiment, reflecting structure corresponding to the visible range is made in the surface of the metal mold which is a reflecting surface, whereby integral molding with the optical element becomes possible and after the molding, it becomes unnecessary to effect evaporation corresponding to the visible range and attach the reflecting film of a wet process, and great simplification of the process can be achieved. Thereby, the stabilization of the quality and mass productivity are improved and inexpensive optical elements are provided.

Description will now be made of Embodiment 2 of the image pickup apparatus having an optical member using the reflecting optical element of the present the same as that of FIG. 4.

Figure 6:
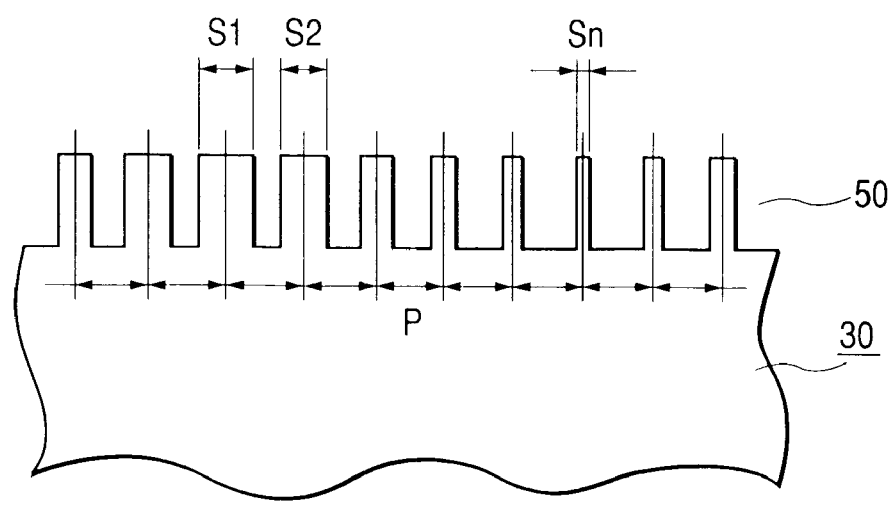
FIG. 6 is an enlarged construction view of the reflecting structure of a reflecting optical element used in Embodiment 2 of the image pickup apparatus.

This embodiment differs in the construction of the reflecting surfaces on the optical element. FIG. 6 is an enlarged typical view of the reflecting surfaces 36, 37 and 38 in the present embodiment.

In FIG. 6, reflecting structure 50 molded integrally with the optical element 30 is substantially constant in its pitch P and is varied in its size S within a predetermined distribution. That is, this is an example which has a distribution in which the duty is swept, whereby the corresponding wavelength range is widened.

In terms of the reflecting characteristic, this embodiment is basically inferior to the aforedescribed embodiments, but it can adopt a method of using an equal pitch mask in photolithography or the like during the making of a metal mold, and sweeping the width of the pattern by etching on the like and therefore, has the merit that the making of the metal mold becomes easy.

Likewise, although not shown, it is also possible to make the size S substantially constant and change the pitch P in a predetermined distribution to thereby widen the wavelength range. This construction is suitable for a method such as etching utilizing self-organizing which does not use a mask during the making of the metal mold.

Also, while the reflecting structure 50 of the present embodiment becomes a two-dimensional pattern in which the pitch is the same and the size S (duty) is regularly modulated, it can be grasped as having a predetermined range of structure in each of the areas in the reflecting surfaces 36, 37 and 38 such as an area of great duty and an area of small duty. That is, it is also possible to divide the area and construct a reflecting surface of a plurality of areas having a predetermined range of structure.

By adopting such construction, the mask can be constructed of a mosaic of discrete units by a patterning process and therefore, there is obtained the effect that it becomes possible to make the same number of units correspond to a more generalized specification. Also, the uniformity of the reflectance and the spectral characteristic can be improved.

While in the above-described embodiments, in order to make the effect of the present invention clear, the construction and effect of the embodiments of the same materials as the metallic simple substance, the dielectric simple substance and the substrate have been made clear as the reflecting structure, the present invention is essentially not restricted thereto.

For example, although not shown, it is also possible to improve the efficiency by the reflecting construction, though it becomes difficult to make it.

Also, although the process becomes complicated, it is also possible to optimize the characteristic by a hybrid type in which a reflecting structure of a metal or a dielectric material is further made, in contrast with a reflecting structure integrally molded on a substrate.

Also, while only the convex structure protruded from the surface of the substrate has been described as the reflecting structure, the present invention is essentially not restricted thereto, but of course, it is also theoretically possible to make similar potential structure by the concave structure of the substrate.

Further, it is also possible to fill the concave structure with a metal or another kind of dielectric material to thereby improve the characteristic thereof.

Furthermore, it is also possible to make the size S and the pitch P proper to thereby provide not only reflecting surfaces but also semi-transmitting surfaces.

Also, while the embodiments of divided areas have been described, the areas are not restricted to the interior of the reflecting surfaces, but when for example, a plurality of reflecting surfaces are used, it is possible to adopt optimum reflecting structure for each reflecting surface in accordance with the shape (such as concavity or convexity or average curvature) and role (such as a quadratic imaging surface or a pupil surface) of the surface, and fill the performance with a total.

As described above, by forming a reflecting surface having grating structure having a pitch smaller by a predetermined percentage than the wavelength used, there can be realized a reflecting optical element which is inexpensive and small in the irregularity of the optical performance (uniform reflectance is obtained).

Further, integral molding is possible by molding and therefore the efficiency of production becomes higher, and a more inexpensive reflecting optical element can be realized.

Also, when an object image is to be formed on a predetermined surface by the use of an optical element in which an entrance surface on which a light beam is refracted and incident, a plurality of reflecting surfaces having curvatures for sequentially reflecting the incident light beam, and an exit surface from which the light beam reflected by the plurality of reflecting surfaces is refracted and emerges are integrally formed on the surface of a transparent member, an appropriate reflecting optical element can be applied to the plurality of reflecting surfaces to thereby achieve an image pickup apparatus by which a good object image is obtained.

What is claimed is:

1. An optical element for reflecting light comprising:
a substrate transmitting a light of a predetermined wavelength therethrough, said substrate including:
two refracting surfaces; and
at least one reflecting surface having a plurality of structures that, as measured along a respective said at least one reflecting surface, are smaller in length than the predetermined wavelength;
wherein the light of the predetermined wavelength incident from one of said two refracting surfaces is internally reflected by said at least one reflecting surface, and thereafter is directed to the other refracting surface, and
wherein said at least one reflecting surface is a curved surface in which, at a point whereat a reference axis intersects, the reference axis and a surface normal do not coincide with each other.

2. The optical element according to claim 1, wherein said at least one reflecting surface is a rotation-asymmetrical aspherical surface.

\* \* \* \* \*

UNITED STATES PATENT AND TRADEMARK OFFICE
CERTIFICATE OF CORRECTION

PATENT NO. : 6,690,684 B1
DATED : February 10, 2004
INVENTOR(S) : Hiroaki Hoshi

It is certified that error appears in the above-identified patent and that said Letters Patent is hereby corrected as shown below:

Column 8,
Line 41, "light" should read -- light, --.

Signed and Sealed this

Seventh Day of September, 2004

JON W. DUDAS
*Director of the United States Patent and Trademark Office*